US012793974B2

(12) United States Patent
Lho et al.

(10) Patent No.: US 12,793,974 B2
(45) Date of Patent: Nov. 10, 2026

(54) POSITIVE ELECTRODE ACTIVE MATERIAL FOR LITHIUM SECONDARY BATTERY AND LITHIUM SECONDARY BATTERY COMPRISING THE SAME

(71) Applicant: LG Energy Solution, Ltd., Seoul (KR)

(72) Inventors: Eun-Sol Lho, Daejeon (KR); Joong-Yeop Do, Daejeon (KR); Kang-Joon Park, Daejeon (KR); Gi-Beom Han, Daejeon (KR); Min Kwak, Daejeon (KR); Sang-Min Park, Daejeon (KR); Dae-Jin Lee, Daejeon (KR); Sang-Wook Lee, Daejeon (KR); Wang-Mo Jung, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 650 days.

(21) Appl. No.: 18/039,345

(22) PCT Filed: Dec. 7, 2021

(86) PCT No.: PCT/KR2021/018489
§ 371 (c)(1),
(2) Date: May 30, 2023

(87) PCT Pub. No.: WO2022/124774
PCT Pub. Date: Jun. 16, 2022

(65) Prior Publication Data

US 2024/0250254 A1 Jul. 25, 2024

(30) Foreign Application Priority Data

Dec. 7, 2020 (KR) ........................ 10-2020-0169213

(51) Int. Cl.
*H01M 4/00* (2006.01)
*C01G 53/506* (2025.01)
(Continued)

(52) U.S. Cl.
CPC .......... *H01M 4/525* (2013.01); *C01G 53/506* (2025.01); *H01M 4/131* (2013.01);
(Continued)

(58) Field of Classification Search
CPC ........ H01M 4/525; H01M 4/02; H01M 4/131; H01M 10/052; C01G 53/00; Y02E 60/10
See application file for complete search history.

(56) References Cited

U.S. PATENT DOCUMENTS

2015/0010819 A1 1/2015 Lee et al.
2019/0020024 A1 1/2019 Wang et al.
(Continued)

FOREIGN PATENT DOCUMENTS

CN 111989805 A * 11/2020 .......... H01M 10/052
KR 20140098424 A 8/2014
(Continued)

OTHER PUBLICATIONS

Jin et al., Positive Electrode Material For Lithium Secondary Battery And Positive Electrode For Lithium Secondary Battery And Lithium Secondary Battery Containing The Same, Nov. 2020, See the Abstract. (Year: 2020).*
(Continued)

*Primary Examiner* — Tiffany Legette
*Assistant Examiner* — Monique M Wills
(74) *Attorney, Agent, or Firm* — Lerner David LLP

(57) ABSTRACT

Provided is a positive electrode active material comprising at least one secondary particle comprising an agglomerate of a primary macro particle, a method for preparing the same and a lithium secondary battery comprising the same.
By the simultaneous use of the secondary particle comprising a primary macro particle and a monolith, it is possible to provide a nickel-based positive electrode active material with reduced particle cracking in the positive electrode
(Continued)

active material during a rolling process and improved charge/discharge cycling characteristics.

13 Claims, 3 Drawing Sheets

(51) Int. Cl.

| | |
|---|---|
| ***H01M 4/131*** | (2010.01) |
| ***H01M 4/525*** | (2010.01) |
| ***H01M 10/052*** | (2010.01) |
| *H01M 4/02* | (2006.01) |

(52) U.S. Cl.

CPC ....... *H01M 10/052* (2013.01); *C01P 2002/50* (2013.01); *C01P 2002/60* (2013.01); *C01P 2004/50* (2013.01); *C01P 2004/61* (2013.01); *C01P 2004/62* (2013.01); *C01P 2006/40* (2013.01); *H01M 2004/021* (2013.01); *H01M 2004/028* (2013.01)

(56) References Cited

U.S. PATENT DOCUMENTS

| | | | |
|---|---|---|---|
| 2019/0393479 | A1 | 12/2019 | Kim et al. |
| 2020/0161650 | A1 | 5/2020 | Park et al. |
| 2020/0185714 | A1 | 6/2020 | Han et al. |
| 2020/0388830 | A1 | 12/2020 | Lee et al. |
| 2023/0047021 | A1 | 2/2023 | Yamamoto et al. |
| 2023/0246168 | A1 | 8/2023 | Sakitani et al. |

FOREIGN PATENT DOCUMENTS

| | | | |
|---|---|---|---|
| KR | 101785262 | B1 | 10/2017 |
| KR | 20190006906 | A | 1/2019 |
| KR | 20190041715 | A | 4/2019 |
| KR | 20190059249 | A | 5/2019 |
| KR | 20190093453 | A | 8/2019 |
| KR | 20190093454 | A | 8/2019 |
| KR | 20190143088 | A | 12/2019 |
| KR | 20200030287 | A | 3/2020 |
| KR | 20200070649 | A | 6/2020 |
| WO | 2021-153397 | A1 | 8/2021 |
| WO | 2022-044935 | A1 | 3/2022 |

OTHER PUBLICATIONS

International Search Report for Application No. PCT/KR2021/018489 mailed Mar. 18, 2022, pp. 1-3.

Extended European Search Report including Written Opinion for Application No. 21903820.5 dated May 24, 2024. 6 pgs.

* cited by examiner

POSITIVE ELECTRODE ACTIVE MATERIAL FOR LITHIUM SECONDARY BATTERY AND LITHIUM SECONDARY BATTERY COMPRISING THE SAME

CROSS-REFERENCE TO RELATED APPLICATIONS

The present application is a national phase entry under 35 U.S.C. § 371 of International Application No. PCT/KR2021/018489, filed on Dec. 7, 2021, which claims priority to Korean Patent Application No. 10-2020-0169213 filed on Dec. 7, 2020, in the Republic of Korea, the disclosures of which are incorporated herein by reference.

TECHNICAL FIELD

The present disclosure relates to a positive electrode active material for a lithium secondary battery comprising primary macro particles and a method for preparing the same.

BACKGROUND ART

Recently, with the widespread use of electronic devices using batteries, for example, mobile phones, laptop computers and electric vehicles, there is a fast growing demand for secondary batteries with small size, light weight and relatively high capacity. In particular, lithium secondary batteries are gaining attention as a power source for driving mobile devices due to their light weight and high energy density advantages. Accordingly, there are many efforts to improve the performance of lithium secondary batteries.

A lithium secondary battery includes an organic electrolyte solution or a polymer electrolyte solution filled between a positive electrode and a negative electrode made of an active material capable of intercalating and deintercalating lithium ions, and electrical energy is produced by oxidation and reduction reactions during intercalation/deintercalation of lithium ions at the positive electrode and the negative electrode.

The positive electrode active material of the lithium secondary battery includes lithium cobalt oxide ($LiCoO_2$), lithium nickel oxide ($LiNiO_2$), lithium manganese oxide ($LiMnO_2$ or $LiMn_2O_4$) and a lithium iron phosphate compound ($LiFePO_4$). Among them, lithium cobalt oxide ($LiCoO_2$) is widely used due to its high operating voltage and large capacity advantages, and is used as a positive electrode active material for high voltage. However, cobalt (Co) has a limitation on the use in a large amount as a power source in the field of electric vehicles due to its price rise and unstable supply, and thus there is a need for development of an alternative positive electrode active material. Accordingly, nickel cobalt manganese based lithium composite transition metal oxide (hereinafter simply referred to as 'NCM based lithium composite transition metal oxide') with partial substitution of nickel (Ni) and manganese (Mn) for cobalt (Co) has been developed.

Meanwhile, most attempts to increase the output and press density are to use two types of positive electrode active materials having different sizes. In this instance, the positive electrode active material may be a secondary particle formed by agglomeration of primary particles. However, a positive electrode manufactured using secondary particles formed by agglomeration of primary particles may have electron movement path losses in the electrode and the increased surface area at which side reactions with the electrolyte solution occur due to cracks of the primary particle and/or the secondary particle in a rolling step of the electrode manufacturing process. This results in poor life characteristics.

DISCLOSURE

Technical Problem

The present disclosure is designed to solve the above-described problem, and therefore the present disclosure is directed to providing a positive electrode active material with minimized particle cracking during a rolling process by controlling the particle size and the particle shape.

Accordingly, the present disclosure is further directed to providing a nickel-based positive electrode active material with reduced particle cracking during the rolling process and improved life characteristics.

Technical Solution

An aspect of the present disclosure provides a positive electrode active material according to the following embodiments.

Specifically, the present disclosure relates to a positive electrode active material for a lithium secondary battery comprising a first positive electrode active material and a second positive electrode active material, wherein the first positive electrode active material comprises at least one monolith, the second positive electrode active material comprises a secondary particle comprising an agglomerate of a primary macro particle, the monolith is a single particle having an average particle size D50 of 3 to 10 μm, an average particle size D50 of the primary macro particle is 1 μm or more, and an average particle size D50 of the secondary particle is 1 to 10 μm.

The average particle size D50 of the monolith may be larger than the average particle size D50 of the secondary particle, and more specifically, the average particle size D50 of the monolith may be 1.1 to 2 times larger than the average particle size D50 of the secondary particle.

A weight ratio of the first positive electrode active material and the second positive electrode active material may be 90:10 to 10:90.

A particle strength of the first positive electrode active material may be larger than a particle strength of the second positive electrode active material.

The particle strength of the first positive electrode active material may be equal to or larger than 200 MPa, and the particle strength of the second positive electrode active material may be equal to or less than 120 MPa.

A ratio of the average particle size D50 of the primary macro particle to an average crystal size of the primary macro particle may be equal to or larger than 2.

An average crystal size of the primary macro particle may be equal to or larger than 190 nm.

A ratio of the average particle size D50 of the secondary particle to the average particle size D50 of the primary macro particle may be 2 to 5 times.

Each of the first and second positive electrode active materials may independently comprise a nickel-based lithium transition metal oxide.

The nickel-based lithium transition metal oxide of each of the first and second positive electrode active materials may independently comprise $Li_aNi_{1-b-c-d}Co_bMn_cQ_dO_{2+\delta}$ wherein $1.0 \le a \le 1.5$, $0<b<0.2$, $0<c<0.2$, $0 \le d \le 0.1$, $0<b+c+d \le 0.2$, $-0.1 \le \delta \le 1.0$, and Q is at least one metal selected from the group consisting of Al, Mg, V, Ti and Zr.

The present disclosure provides the following positive electrode for a lithium secondary battery. Specifically, the present disclosure relates to a positive electrode active material for a lithium secondary battery comprising the above-described positive electrode active material, wherein the primary macro particle is disposed in a space formed by contact of the first positive electrode active material and the second positive electrode active material.

The primary macro particle may be disposed in a space formed by contact of the first positive electrode active material with additional first positive electrode active materials.

An aspect of the present disclosure provides a lithium secondary battery comprising a positive electrode comprising the positive electrode active material.

Advantageous Effects

According to an embodiment of the present disclosure, compared to the bimodal use of a secondary particle macro particle and a secondary particle micro particle, it is possible to markedly prevent particle cracking or fine particle generation during the rolling process, thereby greatly improving the life characteristics.

According to an embodiment of the present disclosure, compared to the use of monoliths alone, it is possible to markedly prevent particle cracking or fine particle generation during the roll process, thereby greatly improving the life characteristics.

DESCRIPTION OF DRAWINGS

The accompanying drawings illustrate a preferred embodiment of the present disclosure, and together with the above description, serve to help a further understanding of the technical aspects of the present disclosure, so the present disclosure should not be construed as being limited to the drawings. Meanwhile, the shape, size, scale or proportion of the elements in the drawings of the specification may be exaggerated to emphasize a more clear description.

DETAILED DESCRIPTION

Figure 1A:
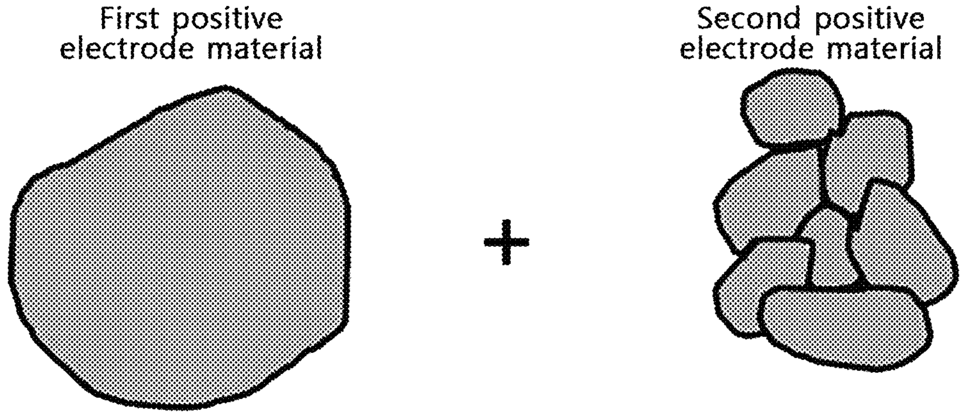
FIG. 1*a* is a schematic diagram of a first positive electrode active material and a second positive electrode active material according to an embodiment of the present disclosure.
Figure 1B:
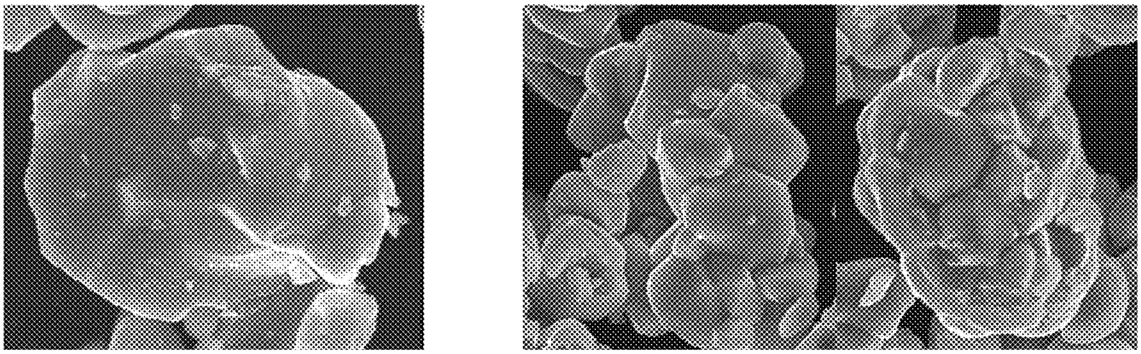
FIG. 1*b* is a scanning electron microscopy (SEM) image of a first positive electrode active material and a second positive electrode active material according to an embodiment of the present disclosure.
Figure 1C:
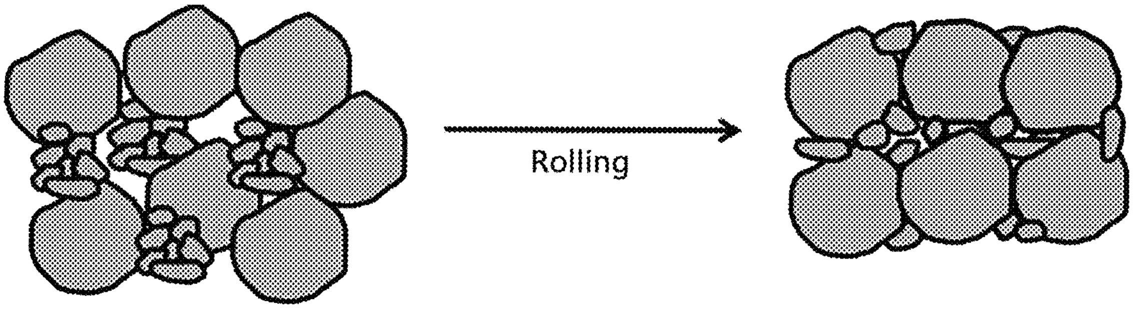
FIG. 1*c* is a schematic diagram of a positive electrode active material according to example 1 of the present disclosure.

Hereinafter, embodiments of the present disclosure will be described in detail. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the disclosure of the embodiments described herein is just a most preferred embodiment of the present disclosure, but not intended to fully describe the technical aspects of the present disclosure, so it should be understood that a variety of other equivalents and modifications could have been made thereto at the time that the application was filed.

Unless the context clearly indicates otherwise, it will be understood that the term "comprises" when used in this specification, specifies the presence of stated elements, but does not preclude the presence or addition of one or more other elements.

In the specification and the appended claims, "comprising multiple crystal grains" refers to a crystal structure formed by two or more crystal particles having a specific range of average crystal sizes. In this instance, the crystal size of the crystal grain may be quantitatively analyzed using X-ray diffraction analysis (XRD) by Cu Kα Xrα. Specifically, the average crystal size of the crystal grain may be quantitatively analyzed by putting a prepared particle into a holder and analyzing diffraction grating for X-ray radiation onto the particle.

In the specification and the appended claims, D50 may be defined as a particle size at 50% of particle size distribution, and may be measured using a laser diffraction method. For example, a method for measuring the average particle size D50 of a positive electrode active material may include dispersing particles of the positive electrode active material in a dispersion medium, introducing into a commercially available laser diffraction particle size measurement device (for example, Microtrac MT 3000), irradiating ultrasound of about 28 kHz with the output power of 60 W, and calculating the average particle size D50 corresponding to 50% of cumulative volume in the measurement device.

In the present disclosure, 'primary particle' refers to a particle having seemingly absent grain boundary when observed with the field of view of 5000 to 20000 magnification using a scanning electron microscope. In the present disclosure, the primary particle may be classified into a primary micro particle and a primary macro particle according to the average particle size D50.

In the present disclosure, 'secondary particle' is a particle formed by agglomeration of the primary particles. In the present disclosure, the secondary particle may be classified into a secondary macro particle and a secondary micro particle according to the average particle size D50.

In the present disclosure, 'monolith' refers to a particle that exists independently of the secondary particle, and has seemingly absent grain boundary.

In the present disclosure, 'particle' may include any one of the monolith, the secondary particle and the primary particle or all of them.

Positive Electrode Active Material

In a lithium secondary battery, in most cases, a mixture of two types of particles having different particle size distributions is used for a positive electrode active material to improve the energy density per volume. For example, the use of a positive electrode active material in the form of a macro particle and a positive electrode active material in the form of a micro particle at an optimal mix ratio shows higher density than a value obtained by arithmetically calculating the density values of macro/micro particles in the same pressure condition due to the bimodal effect.

Meanwhile, a rolling process is usually performed when manufacturing a positive electrode using positive electrode active material particles. In this instance, when the positive electrode active material particle is a so-called secondary particle formed by agglomeration of primary particles, particle cracking may occur in the rolling process. The particle cracking results in electrical conductivity losses, increased surface area and consequential severe side reactions with the electrolyte solution. This results in poor life characteristics.

An aspect of the present disclosure provides a positive electrode active material comprising a secondary particle of different type from the conventional art.

Specifically, there is provided a positive electrode active material for a lithium secondary battery comprising a first positive electrode active material and a second positive electrode active material, wherein the first positive electrode active material comprises at least one monolith, the second positive electrode active material comprises at least one secondary particle comprising an agglomerate of primary macro particles, the monolith is a single particle having the average particle size D50 of 3 to 10 μm, the average particle size D50 of the primary macro particles is 1 μm or more, and the average particle size D50 of the secondary particle is 1 to 10 μm.

The positive electrode active material having the above-described features may provide a nickel-based positive electrode active material with increased charge/discharge capacity retention. Additionally, it is possible to provide the positive electrode active material with reduced fine particle generation during the rolling process.

Hereinafter, the above-described features of the primary and secondary particles will be described in detail.

First Positive Electrode Active Material

In the present disclosure, the first positive electrode active material comprises at least one monolith.

In this instance, the monolith refers to a particle that exists independently of the secondary particle, and has seemingly absent grain boundary, and in the present disclosure, the monolith is a single particle having the average particle size D50 of 3 to 10 μm.

Second Positive Electrode Active Material

In the present disclosure, the second positive electrode active material comprises a secondary particle formed by agglomeration of primary macro particles. The conventional secondary particle is formed by agglomeration of a few tens to a few hundreds of primary micro particles. In contrast, in an aspect of the present disclosure, "secondary particle" is formed by agglomeration of primary macro particles having the average particle size D50 of the primary particle of 1 μm or more.

The inventors found that a mixture of a secondary particle macro particle and a secondary particle micro particle having different sizes according to the conventional art suffers cracks of the secondary particle in the rolling process, causing degradation of the electrical and chemical properties. In this instance, the secondary particle macro particle and the secondary particle micro particle are a secondary particle formed by agglomeration of a few tens to a few hundreds of primary micro particles having the average particle size on the level of a few hundreds of nanometers, and a secondary particle having a large average particle size D50 is referred to as a "secondary particle macro particle", and a secondary particle having a small average particle size D50 is referred to as a "secondary particle micro particle".

In contrast, an aspect of the present disclosure may prevent cracking in the rolling process by mixing the "secondary particle formed by agglomeration of primary macro particles" with the conventional "monolith" at an optimal ratio. Since the particle strength of the monolith is larger than the particle strength of the secondary particle according to the present disclosure, the monolith does not crack in the rolling process, and at the same time, in the secondary particle according to the present disclosure, the primary macro particles are separated and do not crack during the rolling process.

That is, in the secondary particle according to an aspect of the present disclosure, for example, during rolling under high pressure, of for example, 9 tons or more to manufacture an electrode, the primary macro particle is separated from the secondary particle, but the separated primary macro particle itself does not crack. Accordingly, it is possible to minimize particle cracking and reduce fine particles. Additionally, the mixture of the first positive electrode active material and the second positive electrode active material fills the empty space, thereby improving the rolling performance and increasing the energy density. As a result, it is possible to improve the life performance.

In the present disclosure, the 'primary macro particle' has the average particle size D50 of 1 μm or more.

In a specific embodiment of the present disclosure, the average particle size of the primary macro particle may be 1 μm or more, 1.5 μm or more, 2 μm or more, 2.5 μm or more, 3 μm or more, or 3.5 μm or more, and may be 5 μm or less, 4.5 μm or less, or 4 μm or less. When the average particle size of the primary macro particle is less than 1 μm, the secondary particle formed by agglomeration of the primary macro particles corresponds to the secondary micro particle, and particle cracking may occur in the rolling process.

In the present disclosure, the 'primary macro particle' may have a ratio of the average particle size D50/the average crystal size of 3 or more. That is, when compared with the primary micro particle that forms the secondary particle, the primary macro particle may have simultaneous growth of the average particle size and the average crystal size of the primary particle.

From the perspective of cracking, a seemingly absent grain boundary like the monolith and a large average particle size are advantageous. Accordingly, the inventors made many efforts to grow the average particle size D50 of the primary particle. In the study, the inventors found that when only the average particle size D50 of the primary particle is increased by over-sintering, rock salt is formed on the surface of the primary particle and the diffusion resistance increases. Additionally, the inventors found that to solve the problem, growing the average crystal size of the primary particle together is advantageous to reduce the diffusion resistance.

That is, in the present disclosure, the primary macro particle refers to a particle having a large average particle size as well as a large average crystal size and a seemingly absent grain boundary.

As described above, when the average particle size and the average crystal size of the primary particle grow at the same time, it is advantageous in terms of low resistance and long life, compared to the monolith having the increased resistance due to the rock salt formed on the surface by sintering at high temperature.

As opposed to the monolith, "the secondary particle formed by agglomeration of primary macro particles" used in an aspect of the present disclosure is advantageous in terms of low resistance resulting from the increased size of the primary particle itself and the reduced rock salt formation.

In this instance, the average crystal size of the primary macro particle may be quantitatively analyzed using X-ray diffraction analysis (XRD) by Cu Kα X-ray. Specifically, the average crystal size of the crystal grain may be quantitatively analyzed by putting the prepared particle into a holder and analyzing diffraction grating for X-ray radiation onto the particle. Sampling is performed by putting a sample in a groove at the center of a common holder for powder and leveling the surface using a slide glass such that the height is equal to the holder edge. The sample is measured using Bruker D8 Endeavor (Cu Kα, λ=1.54° Å) equipped with LynxEye XE-T position sensitive detector with the step size of 0.02° in the scan range of 90° FDS 0.5°, 2-theta 15°, to make the total scan time of ~20 min. Rietveld refinement of the measured data is performed, considering the charge at each site (metals at transition metal site +3, Ni at Li site +2) and cation mixing. In crystal size analysis, instrumental broadening is considered using Fundamental Parameter Approach (FPA) implemented in Bruker TOPAS program, and in fitting, all peaks in the measurement range are used. The peak shape fitting is only performed using Lorentzian contribution to First Principle (FP) among peak types available in TOPAS, and in this instance, strain is not considered. The structure is analyzed through the above-described method, and the average crystal size of the crystal grain may be quantitatively analyzed.

In a specific embodiment of the present disclosure, the ratio of the average particle size D50/the average crystal size may be 2 or more, 2.5 or more, or 3 or more, and may be 50 or less, 40 or less, or 35 or less.

Additionally, the average crystal size of the primary macro particle may be 150 nm or more, 170 nm or more, or 200 nm or more, and may be 300 nm or less, 270 nm or less, or 250 nm or less.

Meanwhile, in the present disclosure, "secondary particle" is an agglomerate of the above-described primary macro particles. The secondary particle is different from the method for obtaining the monolith as described below.

The monolith is only formed by increasing the primary sintering temperature using the existing precursor for secondary particle. In contrast, the secondary particle according to an aspect of the present disclosure uses a precursor having high porosity. Accordingly, it is possible to grow the primary macro particle having a large particle size without increasing the sintering temperature, and by contrast, the average particle size of the secondary particle grows less than the conventional art.

Accordingly, the secondary particle according to an aspect of the present disclosure has the equal or similar average particle size D50 to the conventional secondary particle and a large average particle size D50 of the primary particle. That is, as opposed to the typical configuration of the conventional positive electrode active material, i.e., in the form of a secondary particle formed by agglomeration of primary particles having a small average particle size, it is provided a secondary particle formed by agglomeration of primary macro particles, namely, primary particles having the increased size.

In a specific embodiment of the present disclosure, the secondary particle may be an agglomerate of 1 to 10 primary macro particles. More specifically, the secondary particle may be an agglomerate of 1 or more, 2 or more, 3 or more, or 4 or more primary macro particles in the above-described numerical range, and may be an agglomerate of 10 or less, 9 or less, 8 or less, or 7 or less primary macro particles in the above-described numerical range.

In the present disclosure, the secondary particle has the equal or similar average particle size D50 to the conventional art and a large average particle size D50 of the primary macro particle. That is, as opposed to the typical configuration of the conventional positive electrode active material, i.e., in the form of a secondary particle formed by agglomeration of primary micro particles having a small average particle size, it is provided a secondary particle formed by agglomeration of primary macro particles, namely, primary particles having the increased size.

The secondary particle according to an aspect of the present disclosure has the average particle size D50 of 3 μm to 6 μm. More specifically, the average particle size D50 is 3 μm or more, 3.5 μm or more, 4 μm or more, or 4.5 μm or more, and is 6 μm or less, 5.5 μm or less, or 5 μm or less.

In general, no matter what type of particle, at the same composition, the particle size and the average crystal size in the particle increases with the increasing sintering temperature. In contrast, the secondary particle according to an aspect of the present disclosure may have the growth of primary macro particles having a large particle size using a porous precursor without increasing the sintering temperature, and by contrast, the secondary particle grows less than the conventional art.

Accordingly, the secondary particle according to an aspect of the present disclosure has the equal or similar average particle size D50 to the conventional secondary particle and comprises primary macro particles having a larger average particle size and a larger average crystal size than the conventional primary micro particle.

In a specific embodiment of the present disclosure, a ratio of the average particle size D50 of the secondary particle/the average particle size D50 of the primary macro particle may be 2 to 4 times.

In the present disclosure, the second positive electrode active material comprises the above-described secondary particle. In this instance, in the second positive electrode active material, the primary macro particles may be separated from the secondary particle and may not crack during the electrode rolling process. In this instance, the rolling condition may be the pressure of 9 tons applied.

Accordingly, in the positive electrode active material according to an aspect of the present disclosure, fine particles of 1 μm or less may be less than 10% after rolling under the pressure of 9 tons.

The average particle size D50 of the monolith may be larger than the average particle size D50 of the secondary particle. For example, the average particle size D50 of the monolith may be 1.1 to 2 times larger than the average particle size D50 of the secondary particle.

Amount and Ratio

In the positive electrode active material according to an aspect of the present disclosure, a weight ratio of the first positive electrode active material and the second positive electrode active material is 90:10 to 10:90.

More specifically, the weight ratio of the first positive electrode active material and the second positive electrode active material may be 80:20 to 20:80.

When the first positive electrode active material or the second positive electrode active material is used alone, fine particles formed in the rolling process are present in a larger amount than the positive electrode active material of the present disclosure.

Additionally, when the secondary particle micro particle and the secondary particle macro particle comprising primary micro particles are used like the conventional art, the amount of fine particles may be lower than the amount of fine particles when the secondary particle macro particle is used alone, but particle cracking still occurs and the capacity retention is low.

Composition

The secondary macro particle and/or the secondary micro particle comprises nickel-based lithium transition metal oxide.

In this instance, the nickel-based lithium transition metal oxide may independently comprise $Li_aNi_{1-b-c-d}Co_bMn_cQ_dO_{2+\delta}$ ($1.0 \le a \le 1.5$, $0<b<0.2$, $0<c<0.2$, $0 \le d \le 0.1$, $0<b+c+d \le 0.2$, $-0.1 \le \delta \le 1.0$, Q is at least one selected from the group consisting of Al, Mg, V, Ti and Zr).

Method for Preparing the Positive Electrode Active Material

The positive electrode active material according to an aspect of the present disclosure may be prepared by the following method. However, the present disclosure is not limited thereto.

Specifically, the first positive electrode active material and the second positive electrode active material may be each prepared and mixed together.

For example, the first positive electrode active material comprises monolith, and may be prepared by the method known in the corresponding technical field.

For example, the second positive electrode active material may be prepared by the following method.

Specifically, the method may include mixing a positive electrode active material precursor comprising nickel (Ni), cobalt (Co) and manganese (Mn) with a lithium raw material and performing primary sintering; and after the primary sintering, mixing the precursor with a lithium raw material and performing secondary sintering.

The secondary particle comprising primary particles may be prepared through the primary sintering and the secondary sintering.

The method for preparing the positive electrode active material will be described in further detail for each step.

To begin with, the positive electrode active material precursor comprising nickel (Ni), cobalt (Co) and manganese (Mn) is prepared.

In this instance, the precursor for preparing the first positive electrode active material in the form of a macro particle may be a commercially available positive electrode active material precursor, or may be prepared by a method for preparing a positive electrode active material precursor well known in the corresponding technical field.

For example, the precursor may be prepared by adding an ammonium cation containing complex forming agent and a basic compound to a transition metal solution comprising a nickel containing raw material, a cobalt containing raw material and a manganese containing raw material and causing coprecipitation reaction.

The nickel containing raw material may include, for example, nickel containing acetate, nitrate, sulfate, halide, sulfide, hydroxide, oxide or oxyhydroxide, and specifically, may include at least one of $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, an aliphatic nickel salt or nickel halide, but is not limited thereto.

The cobalt containing raw material may include cobalt containing acetate, nitrate, sulfate, halide, sulfide, hydroxide, oxide or oxyhydroxide, and specifically, may include at least one of $Co(OH)_2$, CoOOH, $Co(OCOCH_3)_2 \cdot 4H_2O$, $Co(NO_3)_2 \cdot 6H_2O$, $CoSO_4$, or $Co(SO_4)_2 \cdot 7H_2O$, but is not limited thereto.

The manganese containing raw material may include, for example, at least one of manganese containing acetate, nitrate, sulfate, halide, sulfide, hydroxide, oxide or oxyhydroxide, and specifically, may include, for example, at least one of manganese oxide such as $Mn_2O_3$, $MnO_2$, $Mn_3O_4$; a manganese salt such as $MnCO_3$, $Mn(NO_3)_2$, $MnSO_4$, manganese acetate, a manganese salt of dicarboxylic acid, manganese citrate and an aliphatic manganese salt; manganese oxyhydroxide or manganese chloride, but is not limited thereto.

The transition metal solution may be prepared by adding the nickel containing raw material, the cobalt containing raw material and the manganese containing raw material to a solvent, to be specific, water, or a mixed solvent of water and an organic solvent (for example, alcohol, etc.) that mixes with water to form a homogeneous mixture, or may be prepared by mixing an aqueous solution of the nickel containing raw material, an aqueous solution of the cobalt containing raw material and the manganese containing raw material.

The ammonium cation containing complex forming agent may include, for example, at least one of $NH_4OH$, $(NH_4)_2SO_4$, $NH_4NO_3$, $NH_4Cl$, $CH_3COONH_4$ or $(NH_4)_2CO_3$, but is not limited thereto. Meanwhile, the ammonium cation containing complex forming agent may be used in the form of an aqueous solution, and in this instance, the solvent may include water or a mixture of water and an organic solvent (specifically, alcohol, etc.) that mixes with water to form a homogeneous mixture.

The basic compound may include at least one of hydroxide or hydrate of alkali metal or alkaline earth metal such as NaOH, KOH or $Ca(OH)_2$. The basic compound may be used in the form of an aqueous solution, and in this instance, the solvent may include water, or a mixture of water and an organic solvent (specifically, alcohol, etc.) that mixes with water to form a homogeneous mixture.

The basic compound may be added to control the pH of the reaction solution, and may be added in such an amount that the pH of the metal solution is 11 to 13.

Meanwhile, the coprecipitation reaction may be performed at 40° C. to 70° C. in an inert atmosphere of nitrogen or argon.

Particles of nickel-cobalt-manganese hydroxide are produced by the above-described process, and settle down in the reaction solution. The precursor having the nickel (Ni) content of 60 mol % or more in the total metal content may be prepared by controlling the concentration of the nickel containing raw material, the cobalt containing raw material and the manganese containing raw material. The settled nickel-cobalt-manganese hydroxide particles are separated by the common method and dried to obtain a nickel-cobalt-manganese precursor. The precursor may be a secondary particle formed by agglomeration of primary particles.

In addition, in the case of the second positive electrode active material in the form of a micro particle comprising secondary micro particles comprising primary macro particles grown in the average particle size and the crystal size, a porous particle may be used for the positive electrode active material precursor.

In this instance, the pH may be controlled to prepare the second positive electrode active material precursor. Specifically, the pH may be controlled to 7 to 9.

Subsequently, the above-described precursor is mixed with the lithium raw material and goes through primary sintering.

The lithium raw material may include, without limitation, any type of material that dissolves in water, and may include, for example, lithium containing sulfate, nitrate, acetate, carbonate, oxalate, citrate, halide, hydroxide or oxyhydroxide. Specifically, the lithium raw material may include at least one of $Li_2CO_3$, $LiNO_3$, $LiNO_2$, LiOH, $LiOH \cdot H_2O$, LiH, LiF, LiCl, LiBr, LiI, $CH_3COOLi$, $Li_2O$, $Li_2SO_4$, $CH_3COOLi$, or $Li_3C_6H_5O_7$.

In the case of high-Ni NCM based lithium composite transition metal oxide having the nickel (Ni) content of 60 mol % or more, the primary sintering may be performed at 800 to 1,000° C., more preferably 830 to 980° C., and even more preferably 850 to 950° C. In the case of low-Ni NCM based lithium composite transition metal oxide having the nickel (Ni) content of less than 60 mol %, the primary sintering may be performed at 900 to 1,100° C., more preferably 930 to 1,070° C., and even more preferably 950 to 1,050° C.

The primary sintering may be performed in air or an oxygen atmosphere, and may be performed for 15 to 35 hours.

Subsequently, after the primary sintering, additional secondary sintering may be performed.

In the case of high-Ni NCM based lithium composite transition metal oxide having the nickel (Ni) content of 60 mol % or more, the secondary sintering may be performed at 600 to 950° C., more preferably 650 to 930° C., and even more preferably 700 to 900° C. In the case of low-Ni NCM based lithium composite transition metal oxide having the nickel (Ni) content of less than 60 mol %, the secondary sintering may be performed at 700 to 1,050° C., more preferably 750 to 1,000° C., and even more preferably 800 to 950° C.

The secondary sintering may be performed in air or an oxygen atmosphere, and may be performed for 10 to 24 hours.

Positive Electrode and Lithium Secondary Battery

According to another embodiment of the present disclosure, there are provided a positive electrode for a lithium secondary battery comprising the positive electrode active material and a lithium secondary battery.

Specifically, the positive electrode comprises a positive electrode current collector and a positive electrode active material layer comprising the positive electrode active material, formed on the positive electrode current collector.

In this instance, the positive electrode active material is the same as described above.

That is, the positive electrode according to an aspect of the present disclosure comprises a first positive electrode active material and a second positive electrode active material on the positive electrode active material layer.

In this instance, the process of manufacturing the positive electrode includes coating a positive electrode active material forming slurry on a current collector, followed by a rolling process. The packing density may increase through the rolling process. In particular, in an aspect of the present disclosure, the primary macro particles are separated from the secondary particle that constitutes the second positive electrode active material during the rolling process. The separated primary macro particles are disposed at a space formed by the contact of the first positive electrode active material and the second positive electrode active material, thereby increasing the packing density of the positive electrode. Additionally, the primary macro particles separated during the electrode rolling process are disposed at a space formed by the contact of the first positive electrode active material with additional first positive electrode active materials, thereby further increasing the packing density of the positive electrode.

In other words, when the mixture of the first positive electrode active material and the second positive electrode active material is used, the primary macro particles are filled in the empty space formed between the positive electrode active materials, thereby improving the tap density and the rolling performance. As a result, after the electrode rolling, the second positive electrode active material is deagglomerated into primary macro particles, thereby minimizing particle cracking. Accordingly, it is possible to provide the positive electrode with improved life characteristics.

In the positive electrode, the positive electrode current collector is not limited to a particular type and may include any type of material having conductive properties without causing any chemical change to the battery, for example, stainless steel, aluminum, nickel, titanium, sintered carbon or aluminum or stainless steel treated with carbon, nickel, titanium or silver on the surface. Additionally, the positive electrode current collector may be generally 3 to 500 μm in thickness, and may have microtexture on the surface to improve the adhesion strength of the positive electrode active material. For example, the positive electrode current collector may come in various forms, for example, films, sheets, foils, nets, porous bodies, foams and non-woven fabrics.

In addition to the positive electrode active material, the positive electrode active material layer may comprise a conductive material and a binder.

In this instance, the conductive material is used to impart conductivity to the electrode, and may include, without limitation, any type of conductive material having the ability to allow the flow of electrons without causing any chemical change to the battery. Specific examples of the conductive material may include at least one of graphite, for example, natural graphite or artificial graphite; carbon-based materials, for example, carbon black, acetylene black, ketjen black, channel black, furnace black, lamp black, thermal black and carbon fibers; metal powder or metal fibers, for example, copper, nickel, aluminum and silver; conductive whiskers, for example, zinc oxide and potassium titanate; conductive metal oxide, for example, titanium oxide; or conductive polymers, for example, polyphenylene derivatives. In general, the conductive material may be included in an amount of 1 to 30 weight % based on the total weight of the positive electrode active material layer.

Additionally, the binder serves to improve the bonds between the positive electrode active material particles and the adhesion strength between the positive electrode active material and the positive electrode current collector. Specific examples of the binder may include at least one of polyvinylidene fluoride (PVDF), polyvinylidene fluoride-hexafluoropropylene copolymer (PVDF-co-HFP), polyvinylalcohol, polyacrylonitrile, carboxymethylcellulose (CMC), starch, hydroxypropyl cellulose, regenerated cellulose, polyvinylpyrrolidone, polytetrafluoroethylene, polyethylene, polypropylene, ethylene-propylene-diene polymer (EPDM), sulfonated-EPDM, styrene butadiene rubber (SBR), fluoro rubber, or a variety of copolymers thereof. The binder may be included in an amount of 1 to 30 weight % based on the total weight of the positive electrode active material layer.

The positive electrode may be manufactured by the commonly used positive electrode manufacturing method except using the above-described positive electrode active material. Specifically, the positive electrode may be manufactured by coating a positive electrode active material layer forming composition comprising the positive electrode active material and optionally, the binder and the conductive material on the positive electrode current collector, drying and rolling. In this instance, the type and amount of the positive electrode active material, the binder and the conductive material may be the same as described above.

The solvent may include solvents commonly used in the corresponding technical field, for example, at least one of dimethyl sulfoxide (DMSO), isopropyl alcohol, N-methylpyrrolidone (NMP), acetone or water. The solvent may be used in such an amount to have sufficient viscosity for good thickness uniformity when dissolving or dispersing the positive electrode active material, the conductive material and the binder and coating to manufacture the positive electrode in view of the slurry coating thickness and the production yield.

Alternatively, the positive electrode may be manufactured by casting the positive electrode active material layer forming composition on a support, peeling off a film from the support and laminating the film on the positive electrode current collector.

According to still another embodiment of the present disclosure, there is provided an electrochemical device comprising the positive electrode. Specifically, the electrochemical device may include a battery or a capacitor, and more specifically, a lithium secondary battery.

Specifically, the lithium secondary battery comprises a positive electrode, a negative electrode disposed opposite the positive electrode, a separator interposed between the positive electrode and the negative electrode and an electrolyte, and the positive electrode is the same as described above. Additionally, optionally, the lithium secondary battery may further comprise a battery case in which an electrode assembly comprising the positive electrode, the negative electrode and the separator is received, and a sealing member to seal up the battery case.

In the lithium secondary battery, the negative electrode comprises a negative electrode current collector and a negative electrode active material layer positioned on the negative electrode current collector.

The negative electrode current collector may include any type of material having high conductivity without causing any chemical change to the battery, for example, copper, stainless steel, aluminum, nickel, titanium, sintered carbon, copper or stainless steel treated with carbon, nickel, titanium or silver on the surface and an aluminum-cadmium alloy, but is not limited thereto. Additionally, the negative electrode current collector may be generally 3 to 500 μm in thickness, and in the same way as the positive electrode current collector, the negative electrode current collector may have microtexture on the surface to improve the bonding strength of the negative electrode active material. For example, the negative electrode current collector may come in various forms, for example, films, sheets, foils, nets, porous bodies, foams and non-woven fabrics.

In addition to the negative electrode active material, the negative electrode active material layer optionally comprises a binder and a conductive material. For example, the negative electrode active material layer may be made by coating a negative electrode forming composition comprising the negative electrode active material, and optionally the binder and the conductive material on the negative electrode current collector and drying, or casting the negative electrode forming composition on a support, peeling off a film from the support and laminating the film on the negative electrode current collector.

The negative electrode active material may include compounds capable of reversibly intercalating and deintercalating lithium. Specific examples of the negative electrode active material may include at least one of a carbonaceous material, for example, artificial graphite, natural graphite, graphitizing carbon fibers, amorphous carbon; a metallic compound that can form alloys with lithium, for example, Si, Al, Sn, Pb, Zn, Bi, In, Mg, Ga, Cd, Si alloy, Sn alloy or Al alloy; metal oxide capable of doping and undoping lithium such as $SiO_\beta$ ($0<\beta<2$), $SnO_2$, vanadium oxide, lithium vanadium oxide; or a complex comprising the metallic compound and the carbonaceous material such as a Si—C complex or a Sn—C complex. Additionally, a metal lithium thin film may be used for the negative electrode active material. Additionally, the carbon material may include low crystalline carbon and high crystalline carbon. The low crystalline carbon typically includes soft carbon and hard carbon, and the high crystalline carbon typically includes high temperature sintered carbon, for example, amorphous, platy, flaky, spherical or fibrous natural graphite or artificial graphite, Kish graphite, pyrolytic carbon, mesophase pitch based carbon fiber, meso-carbon microbeads, mesophase pitches and petroleum or coal tar pitch derived cokes.

Additionally, the binder and the conductive material may be the same as those of the above-described positive electrode.

Meanwhile, in the lithium secondary battery, the separator separates the negative electrode from the positive electrode and provides a passage for movement of lithium ions, and may include, without limitation, any separator commonly used in lithium secondary batteries, and in particular, preferably the separator may have low resistance to the electrolyte ion movement and good electrolyte solution wettability. Specifically, the separator may include, for example, a porous polymer film made of polyolefin-based polymer such as ethylene homopolymer, propylene homopolymer, ethylene/butene copolymer, ethylene/hexene copolymer and ethylene/methacrylate copolymer or a stack of two or more porous polymer films. Additionally, the separator may include common porous non-woven fabrics, for example, nonwoven fabrics made of high melting point glass fibers and polyethylene terephthalate fibers. Additionally, to ensure the heat resistance or mechanical strength, the coated separator comprising ceramics or polymer materials may be used, and may be selectively used with a single layer or multilayer structure.

Additionally, the electrolyte used in the present disclosure may include an organic liquid electrolyte, an inorganic liquid electrolyte, a solid polymer electrolyte, a gel polymer electrolyte, a solid inorganic electrolyte and a molten inorganic electrolyte, available in the manufacture of lithium secondary batteries, but is not limited thereto.

Specifically, the electrolyte may comprise an organic solvent and a lithium salt.

The organic solvent may include, without limitation, any type of organic solvent that acts as a medium for the movement of ions involved in the electrochemical reaction of the battery. Specifically, the organic solvent may include an ester-based solvent, for example, methyl acetate, ethyl acetate, γ-butyrolactone, ε-caprolactone; an ether-based solvent, for example, dibutyl ether or tetrahydrofuran; a ketone-based solvent, for example, cyclohexanone; an aromatic hydrocarbon-based solvent, for example, benzene, fluorobenzene; a carbonate-based solvent, for example, dimethylcarbonate (DMC), diethylcarbonate (DEC), ethylmethylcarbonate (EMC), ethylene carbonate (EC), propylene carbonate (PC); an alcohol-based solvent, for example, ethylalcohol, isopropyl alcohol; nitriles of R—CN (R is C2-C20 straight-chain, branched-chain or cyclic hydrocarbon, and may comprise an exocyclic double bond or ether bond); amides, for example, dimethylformamide; dioxolanes, for example, 1,3-dioxolane; or sulfolanes. Among them, the carbonate-based solvent is desirable, and more preferably, cyclic carbonate (for example, ethylene carbonate or propylene carbonate) having high dielectric constant which contributes to the improved charge/discharge performance of the battery may be mixed with a linear carbonate-based compound (for example, ethylmethyl carbonate, dimethyl carbonate or diethyl carbonate) of low viscosity. In this case, the cyclic carbonate and the chain carbonate may be mixed at a volume ratio of about 1:1 to about 1:9 to improve the performance of the electrolyte solution.

The lithium salt may include, without limitation, any compound that can provide lithium ions used in lithium secondary batteries. Specifically, the lithium salt may include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt may range from 0.1 to 2.0M. When the concentration of the lithium salt is included in the above-described range, the electrolyte has the optimal conductivity and viscosity, and thus may show good electrolyte performance and allow for effective movement of lithium ions.

In addition to the constituent substances of the electrolyte, the electrolyte may further comprise, for example, at least one type of additive of a haloalkylene carbonate-based compound such as difluoro ethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride to improve the life characteristics of the battery, prevent the capacity fading of the battery and improve the discharge capacity of the battery. In this instance, the additive may be included in an amount of 0.1 to 5 weight % based on the total weight of the electrolyte.

The lithium secondary battery comprising the positive electrode active material according to the present disclosure is useful in the field of portable devices comprising mobile phones, laptop computers and digital cameras, and electric vehicles comprising hybrid electric vehicles (HEVs).

Accordingly, according to another embodiment of the present disclosure, there are provided a battery module comprising the lithium secondary battery as a unit cell and a battery pack comprising the same.

The battery module or the battery pack may be used as a power source of at least one medium-large scale device of power tools; electric vehicles comprising electric vehicles (EVs), hybrid electric vehicles, and plug-in hybrid electric vehicles (PHEVs); or energy storage systems.

Hereinafter, the embodiments of the present disclosure will be described in sufficiently detail for those having ordinary skill in the technical field pertaining to the present disclosure to easily practice the present disclosure. However, the present disclosure may be embodied in many different forms and is not limited to the disclosed embodiments.

Example 1

4 liters of distilled water were put into a coprecipitation reactor (capacity 20 L), and while the temperature was maintained at 50° C., 100 mL of 28 wt % ammonia aqueous solution was added, and a transition metal solution with the concentration of 3.2 mol/L, in which $NiSO_4$, $CoSO_4$ and $MnSO_4$ were mixed at a mole ratio of nickel:cobalt:manganese of 0.8:0.1:0.1, and a 28 wt % ammonia aqueous solution were continuously put into the reactor at 300 mL/hr and 42 mL/hr, respectively. Stirring was performed at the impeller speed of 400 rpm, and a 40 wt % sodium hydroxide solution was used to maintain the pH at 9. Precursor particles were formed by 10-hour coprecipitation reaction. The precursor particles were separated, washed and dried in an oven of 130° C. to prepare a precursor.

The $Ni_{0.8}Co_{0.1}Mn_{0.1}(OH)_2$ precursor synthesized by coprecipitation reaction was mixed with LiOH at a mole ratio of Li/Me(Ni, Co, Mn) of 1.05, and thermally treated at 900° C. for 10 hours in an oxygen atmosphere to prepare a first positive electrode active material of $LiNi_{0.8}Co_{0.1}Mn_{0.1}O_2$ lithium composite transition metal oxide.

(Preparation of Second Positive Electrode Active Material)

4 liters of distilled water were put into a coprecipitation reactor (capacity 20 L), and while the temperature was maintained at 50° C., 100 mL of 28 wt % ammonia aqueous solution was added, and a transition metal solution with the concentration of 3.2 mol/L, in which $NiSO_4$, $CoSO_4$ and $MnSO_4$ were mixed at a mole ratio of nickel:cobalt:manganese of 0.8:0.1:0.1, and a 28 wt % ammonia aqueous solution were continuously put into the reactor at 300 mL/hr and 42 mL/hr, respectively. Stirring was performed at the impeller speed of 400 rpm, and a 40 wt % sodium hydroxide solution was used to maintain the pH at 9. Precursor particles were formed by 10-hour coprecipitation reaction. The precursor particles were separated, washed and dried in an oven of 130° C. to prepare a precursor.

The $Ni_{0.8}Co_{0.1}Mn_{0.1}(OH)_2$ precursor synthesized by coprecipitation reaction was mixed with LiOH at a mole ratio of Li/Me(Ni, Co, Mn) of 1.05, and thermally treated at 800° C. for 10 hours in an oxygen atmosphere to prepare a second positive electrode active material of $LiNi_{0.8}Co_{0.1}Mn_{0.1}O_2$ lithium composite transition metal oxide.

Example 2

A positive electrode active material was prepared by the same method as example 1 except that the weight ratio of the first positive electrode active material and the second positive electrode active material was controlled to 60:40, not 80:20. The results are shown in Table 1.

Example 3

In example 3, a first positive electrode active material comprising monolith having the average particle size D50 of 8 μm and a second positive electrode active material comprising a secondary particle having the average particle size D50 of 3 μm were mixed at a weight ratio of 80:20 and the mixture was used for a positive electrode active material. In this instance, the secondary particle was an agglomerate of 10 or less primary macro particles having the diameter of 1 μm or more.

Specifically, the positive electrode active material was prepared as follows:

(Preparation of First Positive Electrode Active Material)

4 liters of distilled water were put into a coprecipitation reactor (capacity 20 L), and while the temperature was maintained at 50° C., 100 mL of 28 wt % ammonia aqueous solution was added, and a transition metal solution with the concentration of 3.2 mol/L, in which $NiSO_4$, $CoSO_4$ and $MnSO_4$ were mixed at a mole ratio of nickel:cobalt:manganese of 0.8:0.1:0.1, and a 28 wt % ammonia aqueous solution were continuously put into the reactor at 300 mL/hr and 42 mL/hr, respectively. Stirring was performed at the impeller speed of 400 rpm, and a 40 wt % sodium hydroxide solution was used to maintain the pH at 9. Precursor particles were formed by 10-hour coprecipitation reaction. The precursor particles were separated, washed and dried in an oven of 130° C. to prepare a precursor.

The $Ni_{0.8}Co_{0.1}Mn_{0.1}(OH)_2$ precursor synthesized by coprecipitation reaction was mixed with LiOH at a mole ratio of Li/Me(Ni, Co, Mn) of 1.07, and thermally treated at 900° C. for 15 hours in an oxygen atmosphere to prepare a first positive electrode active material of $LiNi_{0.8}Co_{0.1}Mn_{0.1}O_2$ lithium composite transition metal oxide.

(Preparation of Second Positive Electrode Active Material)

4 liters of distilled water were put into a coprecipitation reactor (capacity 20 L), and while the temperature was maintained at 50° C., 100 mL of 28 wt % ammonia aqueous solution was added, and a transition metal solution with the concentration of 3.2 mol/L, in which $NiSO_4$, $CoSO_4$ and $MnSO_4$ were mixed at a mole ratio of nickel:cobalt:manganese of 0.8:0.1:0.1, and a 28 wt % ammonia aqueous solution were continuously put into the reactor at 300 mL/hr and 42 mL/hr, respectively. Stirring was performed at the impeller speed of 400 rpm, and a 40 wt % sodium hydroxide solution was used to maintain the pH at 9. Precursor particles were formed by 10-hour coprecipitation reaction. The precursor particles were separated, washed and dried in an oven of 130° C. to prepare a precursor.

The $Ni_{0.8}Co_{0.1}Mn_{0.1}(OH)_2$ precursor synthesized by coprecipitation reaction was mixed with LiOH at a mole ratio of Li/Me(Ni, Co, Mn) of 1.03 and thermally treated at 800° C. for 8 hours in an oxygen atmosphere to prepare a second positive electrode active material of $LiNi_{0.8}Co_{0.1}Mn_{0.1}O_2$ lithium composite transition metal oxide.

Example 4

A positive electrode active material was prepared by the same method as example 3 except that the weight ratio of the first positive electrode active material and the second positive electrode active material was controlled to 20:80, not 80:20. The results are shown in Table 1.

Comparative Example 1

Comparative example 1 was only the first positive electrode active material prepared in example 1.

Comparative Example 2

Comparative example 2 was only the second positive electrode active material prepared in example 1.

Comparative Example 3

Comparative example 3 was only the first positive electrode active material prepared in example 3.

Comparative Example 4

Comparative example 4 was only the second positive electrode active material prepared in example 3.

TABLE 1

| Classification | | Size (D50) (μm) | Size (D50) of primary macro particle (μm) | Particle strength (MPa) | Average crystal size of primary macro particle (nm) | Blending ratio | Life (Capacity retention) |
|---|---|---|---|---|---|---|---|
| Example 1 | First positive electrode active material | Monolith having the average particle size of 5 μm | | 200 | 260 | 80 | 89.9 |
| | Second positive electrode active material | 4 | 1 | 113 | 210 | 20 | |
| Example 2 | First positive electrode active material | Monolith having the average particle size of 5 μm | | 200 | 260 | 60 | 88.9 |
| | Second positive electrode active material | 4 | 1 | 113 | 210 | 40 | |
| Example 3 | First positive electrode active material | Monolith having the average particle size of 8 μm | | 230 | 280 | 80 | 90.6 |
| | Second positive electrode active material | 3 | 1 | 115 | 210 | 20 | |
| Example 4 | First positive electrode active material | Monolith having the average particle size of 8 μm | | 230 | 280 | 20 | 88.5 |
| | Second positive electrode active material | 3 | 1 | 115 | 210 | 80 | |
| Comparative example 1 | Monolithic positive electrode active material | Monolith having the average particle size of 5 μm | | 200 | 260 | 100 | 80.3 |
| Comparative example 2 | Second positive electrode active material | 4 | 1 | 113 | 210 | 100 | 79.5 |

TABLE 1-continued

| Classification | | Size (D50) (μm) | Size (D50) of primary macro particle (μm) | Particle strength (MPa) | Average crystal size of primary macro particle (nm) | Blending ratio | Life (Capacity retention) |
|---|---|---|---|---|---|---|---|
| Comparative example 3 | Monolithic positive electrode active material | Monolith having the average particle size of 8 μm | | 230 | 280 | 100 | 81.2 |
| Comparative example 4 | Second positive electrode active material | 3 | 1 | 115 | 210 | 100 | 79.3 |

Method for Measuring Residual Capacity of Electrode in 100 Charge/Discharge Cycles.

Positive electrodes were manufactured using the positive electrode active materials according to the examples and comparative examples and the capacity retention was measured by the following method. A 5:5 mixture of artificial graphite and natural graphite as a negative electrode active material, super C as a conductive material and SBR/CMC as a binder were mixed at a weight ratio of 96:1:3 to prepare a negative electrode slurry, and the negative electrode slurry was coated on one surface of a copper current collector, dried at 130° C. and rolled to the porosity of 30% to manufacture a negative electrode.

An electrode assembly including the positive electrode and the negative electrode manufactured as described above and a porous polyethylene separator between the positive electrode and the negative electrode was made and placed in a case, and an electrolyte solution was injected into the case to manufacture a lithium secondary battery.

In this instance, the electrolyte solution was prepared by dissolving 1.0M lithiumhexafluorophosphate ($LiPF_6$) in an organic solvent comprising ethylenecarbonate/ethylmethylcarbonate/diethylcarbonate/(a mix volume ratio of EC/EMC/DEC=3/4/3).

The manufactured lithium secondary battery full cell was charged at 0.5° C., 45° C. in CC-CV mode until 4.2V and discharged at 1 C constant current until 3.0V, and capacity retention in 100 cycles of the charge/discharge test was measured to evaluate the life characteristics. The results are shown in Table 1.

As can be seen from Table 1, when either the first positive electrode active material or the second positive electrode active material was used as described in comparative examples 1 to 4, fine particles formed during the rolling process were present in a larger amount than the positive electrode active material of the present disclosure. In contrast, when the first positive electrode active material and the second positive electrode active material were used at a predetermined ratio, the capacity retention was found to be high. It can be seen that in the case of the present disclosure, the use of the mixture of the first positive electrode active material comprising monolith and the second positive electrode active material comprising the primary macro particles was advantageously acting on rolling and cracking, and thus the life characteristics were improved.

Method for Measuring Particle Strength.

After a penetrator was brought into contact with the positive electrode active material particle using Shimadzu-MCT-W500, a force was applied to the particle, and a force when the particle breaks was measured to measure the particle strength.

Method for Measuring Average Particle Size.

The average particle size D50 may be defined as a particle size at 50% of the cumulative volume of particle size distribution, and in the case of the monolith, D50 refers to the average particle size of the primary particle, and in the case of the secondary particle, D50 refers to the average particle size of the secondary particle.

D50 was measured using a laser diffraction method. After powder was dispersed in a dispersion medium, a cumulative volume particle size distribution graph was obtained by ultrasound irradiation at 28 kHz with the output power of 60 W using a commercially available laser diffraction particle size measurement device Microtrac MT 3000, and a particle size corresponding to 50% of cumulative volume was determined.

Method for Measuring Crystal Size of Primary Particle.

The sample was measured using Bruker D8 Endeavor (Cu Kα, λ=1.54° Å) equipped with LynxEye XE-T position sensitive detector with the step size of 0.02° in the scan range of 90° FDS 0.5°, 2-theta 15°, to make the total scan time of 20 minutes.

Rietveld refinement of the measured data was performed, considering the charge at each site (metals at transition metal site +3, Ni at Li site +2) and cation mixing. In crystal size analysis, instrumental broadening was considered using Fundamental Parameter Approach (FPA) implemented in Bruker TOPAS program, and in fitting, all peaks in the measurement range were used. The peak shape fitting was only performed using Lorentzian contribution to First Principle (FP) among peak types available in TOPAS, and in this instance, strain was not considered.

What is claimed is:

1. A positive electrode active material for a lithium secondary battery, comprising:

a first positive electrode active material and a second positive electrode active material, wherein the first positive electrode active material comprises at least one monolith, wherein the second positive electrode active material comprises a secondary particle comprising an agglomerate of a primary macro particle, wherein the monolith is a single particle having an average particle size (D50) of 3 to 10 μm, wherein an average particle size (D50) of the primary macro particle is 1 μm or more, wherein an average particle size (D50) of the secondary particle is 1 to 10 μm, wherein a ratio of the average particle size (D50) of the primary macro particle to an average crystal size of the primary macro particle is equal to or larger than 2, and wherein the monolith does not include a grain boundary and exists independently of the secondary particle.

2. The positive electrode active material for a lithium secondary battery according to claim 1, wherein the average particle size (D50) of the monolith is larger than the average particle size (D50) of the secondary particle.

3. The positive electrode active material for a lithium secondary battery according to claim 2, wherein the average particle size (D50) of the monolith is 1.1 to 2 times larger than the average particle size (D50) of the secondary particle.

4. The positive electrode active material for a lithium secondary battery according to claim 1, wherein a weight ratio of the first positive electrode active material and the second positive electrode active material is 90:10 to 10:90.

5. The positive electrode active material for a lithium secondary battery according to claim 1, wherein a particle strength of the first positive electrode active material is larger than a particle strength of the second positive electrode active material.

6. The positive electrode active material for a lithium secondary battery according to claim 5, wherein the particle strength of the first positive electrode active material is equal to or larger than 200 MPa, and wherein the particle strength of the second positive electrode active material is equal to or less than 120 MPa.

7. The positive electrode active material for a lithium secondary battery according to claim 1, wherein an average crystal size of the primary macro particle is equal to or larger than 190 nm.

8. The positive electrode active material for a lithium secondary battery according to claim 1, wherein a ratio of the average particle size (D50) of the secondary particle to the average particle size (D50) of the primary macro particle is 2 to 5 times.

9. The positive electrode active material for a lithium secondary battery according to claim 1, wherein each of the first and second positive electrode active materials independently comprises a nickel-based lithium transition metal oxide.

10. The positive electrode active material for a lithium secondary battery according to claim 9, wherein the nickel-based lithium transition metal oxide of each of the first and second positive electrode active materials independently comprises $Li_aNi_{1-b-c-d}Co_bMn_cQ_dO_{2+\delta}$, wherein $1.0 \le a \le 1.5$, $0<b<0.2$, $0<c<0.2$, $0 \le d \le 0.1$, $0<b+c+d \le 0.2$, $-0.1 \le \delta \le 1.0$, and Q is at least one metal selected from the group consisting of Al, Mg, V, Ti and Zr.

11. A positive electrode for a lithium secondary battery, comprising:

the positive electrode active material according to claim 1, wherein the primary macro particle is disposed in a space formed by contact of the first positive electrode active material and the second positive electrode active material.

12. The positive electrode active material for a lithium secondary battery according to claim 11, wherein the primary macro particle is disposed in a space formed by contact of the first positive electrode active material with additional first positive electrode active materials.

13. A lithium secondary battery comprising a positive electrode comprising the positive electrode active material according to claim 1.

* * * * *